UNITED STATES PATENT OFFICE.

PAUL I. MURRILL, OF NEW YORK, N. Y., ASSIGNOR TO MORGAN & WRIGHT, A CORPORATION OF MICHIGAN.

VULCANIZING PROCESS.

1,182,501. Specification of Letters Patent. Patented May 9, 1916.

No Drawing. Application filed March 4, 1915. Serial No. 12,090.

*To all whom it may concern:*

Be it known that I, PAUL I. MURRILL, a citizen of the United States, residing at New York, county and State of New York, have invented certain new and useful Improvements in Vulcanizing Processes, of which the following is a full, clear, and exact disclosure.

My invention relates to processes used in vulcanizing rubber and similar substances, and has for its object to accelerate or increase the vulcanizing action by causing the sulfur or other vulcanizing agent to act more quickly, thus shortening the time during which it is necessary to maintain the rubber in heated condition.

In the practice of my invention I add to the rubber stock or compound at any suitable point during the mixing operation a small quantity of what is known as "bone oil" or "bone tar", a liquid usually obtained from the dry distillation of bones in the manufacture of bone black or animal charcoal. I have found by extended experience in the compounding of rubber where bone oil is used that the latter produces a remarkably beneficial effect during vulcanization by shortening the time required to a marked degree and without in any way injuring the compound or affecting its appearance or natural characteristics. The nature of bone oil or tar is such that there is no granular crystalline residue remaining in the rubber compound after the oil has accomplished its purpose.

I have found that 1 or 2 per cent. of bone oil by weight is sufficient to produce a very beneficial degree of acceleration of the action of sulfur or other vulcanizing agent during vulcanization. However, I do not wish to be understood as being limited to this amount as the percentage may be varied to suit the particular requirements in the compound in which it is used.

Having thus described my invention, what I claim and desire to protect by Letters Patent is:—

1. In the process of vulcanizing, the addition of bone oil as an accelerator of the vulcanizing action.

2. In the process of vulcanizing the addition of a small percentage of bone oil as an accelerator of the vulcanizing action.

3. A vulcanized rubber compound containing sulfur and bone oil as transformed by the heat of vulcanization.

Signed at New York, N. Y., this 2nd day of March, 1915.

PAUL I. MURRILL.

Witnesses:
SAMUEL C. YEATOR.
FRANCIS BOYLE.